United States Patent [19]

Berndt et al.

[11] Patent Number: 4,624,941

[45] Date of Patent: Nov. 25, 1986

[54] PROCESS OF MANUFACTURING A CATALYST FOR PURIFYING THE EXHAUST GASES FROM INTERNAL COMBUSTION ENGINES AND CATALYST PREPARED BY THE PROCESS

[75] Inventors: Malte Berndt; Dieter Ksinsik, both of Sinsheim-Rohrbach, Fed. Rep. of Germany

[73] Assignee: DODUCO K.G. Dr. Eugen Durrwachter, Pforzheim, Fed. Rep. of Germany

[21] Appl. No.: 781,764

[22] Filed: Sep. 30, 1985

[30] Foreign Application Priority Data

Oct. 4, 1984 [DE] Fed. Rep. of Germany ....... 3436400

[51] Int. Cl.$^4$ ..................... B01J 21/04; B01J 23/10; B01J 23/38
[52] U.S. Cl. ................................. 502/302; 502/303; 502/304; 423/213.5
[58] Field of Search ..................... 502/302, 303, 304; 423/213.5

[56] References Cited

U.S. PATENT DOCUMENTS 3,957,692  5/1976  Cairns et al. ................ 502/527 X
4,465,654  8/1984  Faschingbauer ............... 423/213.5

Primary Examiner—W. J. Shine
Attorney, Agent, or Firm—Balogh, Osann, Kramer, Dvorak, Genova & Traub

[57] ABSTRACT

To manufacture a catalyst for purifying the exhaust gases from internal combustion engines, which catalyst comprises a skeleton comprising sintered alumina and at least one stabilizing rare earth element oxide and is preferably provided as a coating on a metallic, mineral or ceramic support, and which catalyst comprises at least one noble metal, which is finely dispersed on said skeleton, a solution is provided, which contains at least one noble metal salt and at least one salt of at least one rare earth element and optionally also an aluminum salt. Said solution is subjected to spray pyrolysis in contact with oxygen to produce a composite powder consisting of at least one noble metal, at least one rare earth element oxide and, if desired, alumina. Said composite powder is applied and sintered to a surface layer of the alumina skeleton.

18 Claims, 1 Drawing Figure

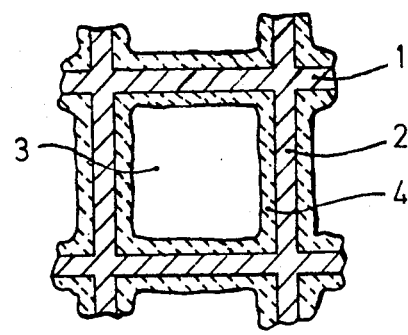

PROCESS OF MANUFACTURING A CATALYST FOR PURIFYING THE EXHAUST GASES FROM INTERNAL COMBUSTION ENGINES AND CATALYST PREPARED BY THE PROCESS

BACKGROUND OF THE INVENTION

1. Field of the Invention

This invention relates to a process of manufacturing a catalyst for purifying the exhaust gases from internal combustion engines, which catalyst comprises a skeleton comprising sintered alumina and at least one stabilizing rare earth element oxide and is preferably provided as a coating on a metallic, mineral or ceramic support, and which catalyst comprises at least one noble metal, which is finely dispersed on the skeleton.

2. Description of the Prior Art

Such process has been disclosed in Published German Application No. 3,223,500. In that known process, active alumina is impregnated with an aqueous solution of a cerium salt and is then dried and heated to 300° to 700° C. in contact with air for 20 to 180 minutes in order to convert the cerium salt to cerium oxide. The aluminum oxide substrate doped with cerium oxide is subsequently impregnated with an aqueous solution of a noble metal salt and is then dried and subsequently calcined at 250° to 640° C. in contact with air in order to expel the solvent, decompose the salt and bond the remaining noble metal to the doped alumina substrate. The substrate may be provided in the form of shaped elements of any desired geometric configuration, such as spheres, cylinders, rods, rings etc.

In many cases the commercial catalyst comprises the alumina on a honeycomb support, which consists of a metal, such as iron, steel or zirconium, or of a ceramic oxide, such as thorium oxide, or of a mineral ceramic material, such as cordierite.

It has been disclosed in Published German Application No. 3,223,500 that such catalysts provided with a separate support can be manufactured in a process in which an aqueous of dispersion of active alumina is prepared first, which dispersion also contains dissolved cerium salt or dispersed cerium oxide, said dispersion is applied in consecutive layers on the honeycomb support and is dried thereon and is subsequently calcined or baked at 300° to 700° C., and the resulting support coated with alumina is finally impregnated with a solution of a noble metal salt, subsequently dried, and calcined at 250° to 650° C. in contact with air.

In order to promote a preferential deposition of the noble metal on the surface of the support, it has been proposed in Published German Application No. 3,223,500 to impregnate the supports with demineralized water in an amount corresponding to 45% of their pore volume before they are impregnated with the solution of the noble metal salt.

Such catalysts are used to purify the exhaust gases of internal combustion engines by an oxidation of the carbon monoxide and hydrocarbons and by a reduction of nitrogen oxides contained in the exhaust gas. For this purpose the catalysts must be suitable for operation at high temperatures. The catalysts described in Published German Application No. 3,223,500 can be operated at temperatures up to about 950° C. Higher temperatures will result in an undesired growth of the particles of alumina and noble metal because they are partly sintered further to form larger particles. That result is highly undesirable because it involves a decrease of the effective surface area of the catalyst and of the conversion capacity of the catalyst. Without the cerium oxide, which in accordance with Published German Application No. 3,223,500 is added to stabilize the alumina skeleton by opposing the recrystallization and sintering of the alumina, such catalyst cannot be operated at temperatures in excess of about 900° C.

SUMMARY OF THE INVENTION

It is an object of the invention to provide a process of manufacturing catalysts which are of the kind described hereinbefore and which have a higher stability at elevated temperatures.

In a process of the kind described first hereinbefore that object is accomplished in that a composite powder consisting of at least one noble metal, noble metals being commonly known and defined as a group of metals including gold, silver, and the platinum group metals, and at least one oxide of at least one rare earth element and, if desired, alumina is produced by spray pyrolysis in the presence of oxygen from a solution which contains at least one noble metal salt, at least one rare earth element salt and preferably also an aluminum salt and said composite powder is applied and sintered to the alumina skeleton at the surface thereof.

Spray pyrolysis is a process that has been described in U.S. Pat. Nos. 3,510,291 and 4,023,961, in European Patent Publication No. A1 0 012 202 and in German Patent Specification No. 2,929,630. Very fine metal powders or metal oxide powders can be produced by spray pyrolysis if metal compounds are dissolved in a liquid and the solution is atomized into a high-temperature reactor or into a flame to effect a sudden evaporation of the solvent, whereafter the resulting solid particles are permitted to react with the oxidizing or reducing atmosphere at a temperature below the melting point of the metals. This results in a formation of very fine powder particles. If spray pyrolysis is effected in a reducing atmosphere, a metallic powder will be obtained.

The spray pyrolysis of a solution containing a compound of an oxidizable metal in an oxidizing atmosphere will result in the formation of an oxide powder.

The separation of the resulting powder particles from the hot gas stream is preferably effected in a dry process rather than by scrubbing with a liquid. For this purpose the hot gas stream laden with the powder particles may be passed through a centrifugal separator.

In connection with the present invention it is significant that the spray pyrolysis is used to process solutions, particularly aqueous solutions, which contain one or more compounds of one or more oxidizable metals (rare earth elements) and at least one compound of a non-oxidizable metal (a catalytically active noble metal). Suitable rare earth elements include mainly cerium, lanthanum, praseodymium and neodymium. Suitable preferable noble metals include (but are not limited to) platinum, palladium, rhodium and ruthenium. The solution preferably also contains an aluminum compound.

If an aqueous solution in which at least one of said rare earth element compounds and at least one of noble metal compounds and, if desired, an aluminium compound, are dissolved, is atomized in a hot oxidizing atmosphere, a very fine composite powder will be obtained, which in addition to the noble metal contains the oxides of the rare earth elements, and, if desired, alumina. The metallic and oxide constituents are contained in the powder particles in a virtually homogeneous distribution. In accordance with the invention such a composite powder is applied and bonded to an alumina skeleton in the production of a catalyst. The resulting catalyst has a much higher stability at elevated temperatures than a catalyst produced in accordance with Published German Application No. 3,223,500. If both catalysts are required to have the same useful life, a catalyst in accordance with the invention can be operated at temperatures which are higher by as much as 100° C. than the highest temperatures which are permissible for the catalysts known in the art. It is believed that the improved stability at elevated temperatures is due to the very fine dispersion of the noble metal and of the rare earth element oxides in the composite powder and in the very fine dispersion of the composite powder in the surface layer of the catalyst so that the risk of a sintering of the noble metal particles to each other is reduced.

Another advantage afforded by the invention resides in that substantially less amount of noble metal is required than in known processes because the noble metal is present in a very fine dispersion so that it has a large effective surface area.

In order to minimize the consumption of noble metal, the noble metal should be deposited only in a surface layer of the alumina skeleton. This may be accomplished in that an aqueous suspension containing a suitable quantity of the composite powder is applied to the surface of the alumina skeleton, which is subsequently dried, and the powder is subsequently sintered to the skeleton at temperatures between 400° and 600° C. In the manufacture of a catalyst in which the alumina skeleton is provided on a separate support, which has a honeycomb structure, particularly on one of the known honeycombs, aqueous suspensions of alumina are applied in consecutive layers to the support and are subsequently dried and sintered, and the composite powder is added to the suspension which is to be applied to form the last (uppermost) alumina layer so that the composite powder is applied to the support together with the suspended alumina for the formation of the last layer, which is subsequently dried and is sintered at temperatures between 400° and 600° C. so that the composite powder and the alumina powder are bonded to the support. Sintering may be effected in contact with air. (The aforementioned consecutive layers are thus free of the rare earth element oxide.)

The alumina which is employed preferably consists of gamma-alumina, which has proved most satisfactory in practice for the present purpose.

The quantity in which the noble metal is required will depend on the requirements to be met by the catalyst. The composite powder preferably contains the noble metal in a proportion of about 10 wt.%.

The weight ratio of at least one noble metal to at least one rare earth element oxide in the composite powder is in the range from 1:50 to 5:10. Preferably, the weight ratio of at least one noble metal to at least one rare earth element oxide in the composite powder is about 1:10.

BRIEF DESCRIPTION OF THE DRAWING

The accompanying drawing is an enlarged diagrammatic fragementary transverse sectional view of a portion of a honeycomb catalyst structure.

DETAILED DESCRIPTION OF THE PREFERRED EMBODIMENTS

The catalyst structure shown on the drawing comprises a cordierite honeycomb having walls 1 and 2, which define between them passages 3 to be flown through by the exhaust gases to be purified. The walls 1 and 2 carry a coating 4 of gamma-alumina, which at or near its surface contains in a fractional part of its thickness a composite powder, which consists of noble metal and at least one rare earth element oxide and has been incorporated by the process in accordance with the present invention.

Illustrative embodiments of the process by which a catalyst as shown on the drawing can be manufactured will now be described.

Example 1

100 parts by weight fine-grained transitional alumina powder and 4 parts by weight of one or more fine-grained powders of rare earth element oxides, particularly lanthanum oxide powder (each of said powders has a particle size below 100 $\mu$m) are suspended in 250 parts by weight of water. A cylindrical cordierite honeycomb having 62 cells per square centimeter of its cross-sectional area and having length of 76 mm and a diameter of 25.4 mm is dipped into said suspension and is subsequently sintered at a temperature of about 500° C. in contact with air. That operation is repeated until the honeycomb has been provided with a mixture of the above-mentioned metal oxides in an amount corresponding to 25 wt.% of the cordierite honeycomb.

An aqueous solution of $H_2PtCl_6$, $Rh(NO_3)_3$ and $La(NO_3)_3$ is sprayed into an oxygen-containing atmosphere in a reactor that has been heated to about 950° C. A fine composite powder is thus obtained, which contains 5 parts by weight of platinum, 1 part by weight of rhodium and 60 parts by weight of lanthanum oxide in close association with each other. 1 part by weight of that composite powder is subsequently suspended in 50 parts by weight of water, and the cordierite honeycomb which has previously been coated with a mixture of alumina and rare earth element oxide is dipped into the suspension of the composite powder and is subsequently dried and sintered at 500° C. in contact with air. That treatment of the coated honeycomb is repeated until 1.5 gram of noble metals have been incorporated in the honeycomb per liter of the volume of the honeycomb.

Example 2

For comparison, a cordierite honeycomb coated with a mixture of alumina and rare earth element oxide is made by a process as described in Example 1. A solution is also prepared in which $H_2PtCl_6$ and $Rh(NO_3)_3$ are contained in a weight ratio of 5:1. The honeycomb is impregnated with that solution until the honeycomb contains 1.5 grams noble metal per liter of the volume of the honeycomb. The impregnated honeycomb is dried and is heated to 500° C. in a reducing atmosphere in order to reduce the noble metal compounds to noble metal.

The catalysts made in the two examples were aged at 1000° for 6 hours in an oxidizing atmosphere and for 2 hours in a reducing atmosphere in order to determine the influence of such a high operating temperature on the catalytic activity. That test was carried out in a reactor. The composition of the gas in the reactor corresponded to a synthetic exhaust gas having the composition obtained by a combustion with an air fuel ratio λ=1.0, which is the ratio of the quantity of combustion air in the air-fuel mixture to the quantity which is stoichiometrically required to burn the fuel. The temperature is determined at which the nitrogen oxides, the hydrocarbons and the carbon monoxide contained in the exhaust gas are reduced each by 90%.

The required conversion is effected with the catalyst in accordance with the invention (Example 1) at a temperature at or above 280° to 300° C. and with the catalyst made in accordance with Example 2 only at temperatures at or above 360° to 380° C. From this comparison it is apparent that the catalyst manufactured in accordance with the invention has a higher stability at elevated temperatures and a higher activity even during the start-up of an engine than a catalyst made in accordance with the prior art.

What is claimed is:

1. In a process of manufacturing a catalyst for purifying exhaust gases of internal combustion engines, which catalyst comprises
    a skeleton comprising sintered alumina,
    at least one rare earth element oxide distributed in said alumina to stabilize the same, and
    at least one finely dispersed noble metal carried by said skeleton on the surface thereof,
    the improvement residing in that
    a composite powder comprising at least one noble metal and at least one rare earth element oxide is produced in that a solution containing in solution at least one noble metal salt and at least one rare earth element salt is subjected to spray pyrolysis in contact with oxygen and
    said composite powder is applied and sintered to said skeleton in a surface layer thereof.

2. The improvement set forth in claim 1 as applied to the manufacture of a catalyst in which said skeleton is carried by a support consisting of a material of the group consisting of metallic, mineral and ceramic materials.

3. The improvement set forth in claim 2, as applied to a process in which consecutive layers comprising alumina are formed on said support, wherein
    an additional layer is formed in that an aqueous suspension which contains said composite powder and alumina powder is applied to the last of said consecutive layers and said powders contained in said suspension are subsequently sintered to each other and to said last preceding layer.

4. The improvement set forth in claim 3, wherein said consecutive layers are free of said rare earth element oxide.

5. The improvement set forth in claim 2 as applied to a process in which consecutive layers comprising alumina are formed on said support, wherein
    said composite powder is made in that a solution containing in solution at least one noble metal salt, at least one rare earth element salt, and an aluminum salt is subjected to spray pyrolysis in contact with oxygen so that the resulting composite powder contains also alumina, and
    an additional layer is formed in that an aqueous suspension of said composite powder is applied and sintered to the last of said consecutive layers.

6. The improvement set forth in claim 5, wherein said consecutive layers are free of said rare earth element oxide.

7. The improvement set forth in claim 1, wherein said composite powder is made in that a solution containing in solution at least one noble metal salt at least one rare earth element salt, and an aluminum salt is subjected to spray pyrolysis in contact with oxygen so that the resulting composite powder contains also alumina.

8. The improvement set forth in claim 7, wherein said weight contents of said alumina and of said at least one rare earth element oxide in said composite powder are of the same order of magnitude.

9. The improvement set forth in claim 8, wherein the weight contents of said alumina and of said at least one rare earth element oxide in said composite powder are approximately the same.

10. The improvement set forth in claim 1, wherein the weight ratio of said at least one noble metal to said at least one rare earth element oxide in said composite powder is in the range from 1:50 to 5:10.

11. The improvement set forth in claim 10, wherein the weight ratio of said at least one noble metal to said at least one rare earth element oxide in said composite powder is about 1:10.

12. The improvement set forth in claim 1, wherein said composite powder is applied to said skeleton in that an aqueous suspension of said composite powder is applied to the surface of said skeleton.

13. The improvement set forth in claim 2, as applied to the manufacture of a catalyst in which said support has a honeycomb structure.

14. The improvement set forth in claim 5, as applied to the manufacture of a catalyst in which said support has a honeycomb structure.

15. The improvement set forth in claim 1, wherein said composite powder is sintered to said skeleton at a temperature in the range from 400° to 600° C.

16. The improvement set forth in claim 1, wherein said composite powder is applied to said skeleton in that the latter is dipped into an aqueous solution of said composite powder.

17. The improvement set forth in claim 1, wherein said at least one rare earth element oxide is provided only at the surface of said skeleton.

18. In a catalyst for purifying exhaust gases of internal combustion engines, which catalyst comprises
    a skeleton comprising sintered alumina,
    at least one rare earth element oxide contacting said alumina to stabilize the same, and
    at least one finely dispersed noble metal carried by said skeleton on the surface thereof,
    the improvement residing in that
    said catalyst is the product of a process in which
    a composite powder comprising at least one noble metal and at least one rare earth element oxide is produced in that a solution containing in solution at least one noble metal salt and at least one rare earth element salt is subjected to spray pyrolysis in contact with oxygen and
    said composite powder is applied and sintered to said skeleton at the surface thereof.

* * * * *